United States Patent Office 3,467,688
Patented Sept. 16, 1969

3,467,688
CONVERSION OF AZO OR AZOXY COMPOUNDS TO ISOCYANATES
Robert Putnam Bennett and Stanley Myron Davis, Bridgewater Township, Somerset County, N.J., assignors to American Cyanamid Company, Stamford, Conn., a corporation of Maine
No Drawing. Filed July 5, 1966, Ser. No. 562,539
Int. Cl. C07c 119/04
U.S. Cl. 260—453          10 Claims

ABSTRACT OF THE DISCLOSURE

Isocyanates are prepared by reacting carbon monoxide and an aromatic azo or azoxy compound in the presence of a catalyst consisting of a noble metal or compound thereof and a Lewis acid, this reaction being conducted under anhydrous, hydrogen-free conditions and at a pressure of at least about 1,000 p.s.i. and temperature of at least about 140° C.

This invention relates to a new method of preparing organic isocyanates. More particularly, it relates to the preparation of isocyanates by reacting an aromatic azo or azoxy compound and carbon monoxide under elevated temperature and pressure conditions and in the presence of a suitable catalyst.

Tons of isocyanates, particularly aromatic isocyanates, are produced and consumed annually. Commercial needs are currently satisfied by a process which comprises reacting phosgene with an amino compound corresponding to the desired isocyanate, the reaction being conducted at elevated temperatures and pressures. Both phosgene and aromatic amino compounds are relatively expensive materials, and operations are often complicated because of the extreme toxicity of phosgene gas. For these and other reasons, there is a definite need for a new method to serve as a commercial route to isocyanates.

It is an object of this invention to provide a method by which isocyanates can be prepared from other starting materials. It is a further object to provide a method by which isocyanates can be prepared without use of phosgene. Other objects will become apparent from the ensuing description of this invention.

In accordance with this invention, it has been discovered that these objects can be efficiently accomplished by a new process which requires as its essential starting materials an aromatic azo or azoxy compound, carbon monoxide and a special type of catalyst. The reaction of this invention effects the splitting of the azo or azoxy group and addition of a carbonyl group on each nitrogen with the consequent formation of 2 moles of isocyanate for each mole of the starting material. The reaction can be schematically represented as follows:

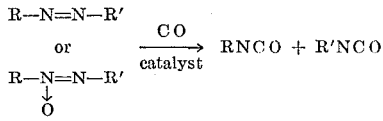

wherein R and R' are carbocyclic aryl radicals. The R groups can bear substituents such as alkyl, alkenyl, aryl, aralykyl, alkoxy, halogen, hydroxy, nitro, mercapto, alkylthio, carboxy, carbalkoxy, cyano, acyl, sulfo, sulfonyl, sulfoxy, isocyanato, etc. When the R's are alike, a single product is obtained. When the R's are not alike, a mixture of two isocyanates is obtained.

The reaction between the azo or azoxy compound and carbon monoxide can be carried out in an autoclave or any other high pressure reactor. The reaction mixture should be preferably anhydrous and the atmosphere should be substantially hydrogen-free. A simple procedure is to charge the starting compound and catalyst in a solvent, if one is employed, into the reaction vessel, introduce the proper amount of carbon monoxide, and then heat the mixture to obtain the desired reaction pressure and temperature. The reaction can be conducted as a continuous operation, or batch-wise. Of course, the order of addition of the reactants may be varied to suit the particular apparatus which is employed. For example, the reactants may be introduced on a continuous basis into the heated reactor while, at the same time, the product is withdrawn. The reaction product is recovered and then treated by conventional procedures to effect separation of isocyanate from unreacted starting material, solvent, by-product, etc.

The present invention provides a generally applicable process for converting an azo or azoxy compound to an isocyanate.

The reaction between the azo or azoxy compound and carbon monoxide can be carried out in an autoclave or other high pressure reactor. A catalyst is used to promote the reaction. The use of an inert solvent is beneficial to the ease of carrying out the reaction.

The aromatic azo compounds wherein R and R' are alike include, for example, azobenzene, m,m'-azotoluene, o,o'-azotoluene, p,p'-azotoluene, 4,4'-dichloroazobenzene, 3,3'-difluoroazobenzene, 4,4'-diisocyanatoazobenzene, 2,2'-dinitroazobenzene, 2,2'-diphenoxyazobenzene, 4,4'-diphenylazobenzene, 3,3'-divinylazobenzene, 4,4'-azo-m-xylene, 2,2',5,5'-tetramethoxyazobenzene, 2,2',4,4'-tetrachloroazobenzene, 4,4'-azodianisole 4,4'-azobis(acetanilide), 3,3'-azodiphenol, 1,1'-azonaphthalene, 1,1'-dichloro-2,2'-azonaphthalene, 3,3'-azodibenzoic acid, dimethyl 3,3'-azodibenzoate, 4,4''-azodibenzophenone, 2,2'-azodibenzenethiol, 4,4'-bis(methylthio)-azobenzene, etc.

Azo compounds wherein R and R' are dissimilar include, for example, M,P'-azotoluene, 4-bromoazobenzene, 2-chloroazobenzene, 4,4'-dichloro-2-nitroazobenzene, 2,4-dimethoxyazobenzene, 2-ethyl-2'-methylazobenzene, etc.

Aromatic azoxy compounds wherein R and R' are alike include, for example, azoxybenzene, p,p'-azoxytoluene, 2,2'-azoxynaphthalene, 4,4'-bis(hexyloxy)azoxybenzene, 4,4' - bis(methylthio)azoxybenzene, 4,4'-bis(phenylsulfonyl)azoxybenzene, 3,3'-dibromoazoxybenzene, 4,4'-azoxydiphenetole, 4,4'-dinitroazoxybenzene, 4,4'-diphenylazoxybenzene, 4,4'-azoxydiphenol, 3',3'''-azoxybis(acetanilide), etc.

Azoxy compounds wherein R and R' are dissimilar include, for example, 2-chloroazoxybenzene, 3-nitroazoxybenzene, etc.

As noted above, the process of this invention is applicable to compounds with or without other substituents, such as alkyl, alukenyl, alkoxy, halogen, acylamido, hydroxy, nitro, mercapto, alkylthio, carboxy, carbalkoxy, cyano, acyl, sulfo, sulfonyl, sulfamyl, carbamyl, phosphono, phosphino and silyl radicals. Substituents do not, in general, interfere with the reaction of this invention. Certain substituents may themselves react with carbon monoxide concurrent with the desired reaction, but the latter reaction, nevertheless, occurs. Other groups in the starting material may react with the isocyanate group, thus yielding derivatives of isocyanates as reaction products. Still others may sterically retard the rate of isocyanate formation without preventing it entirely. With these qualifications, the process of this invention is applicable to an aromatic azo or azoxy compound.

Reaction conditions can be varied over a wide range provided several requirements with respect to pressure and temperature are met. Pressures within the reactor must be in the range of about 40 p.s.i. to 100,000 p.s.i., or higher. Preferably, the pressure should be above 1,000 p.s.i. The reaction will proceed at temperatures above 60° C., and preferably between 150° C., and the temperature of decomposition of either the starting material or the product. The temperature will vary inversely with residence time of material in the reactor. With more reactive starting materials, less stringent conditions may be employed. The particular conditions for a given reactant are easily determined in accordance with the foregoing principles.

It is desirable that a solvent be employed when the starting compounds are solids under the reaction conditions. Suitable solvents are anhydrous liquids in which the compound is soluble or dispersible, e.g., benzene, toluene, xylene, aliphatic halogenated hydrocarbons such as 1,1,2-trichloro-1,2,2-trifluoroethane, halogenated aromatic hydrocarbons such as monochlorobenzene, dichlorobenzene and trichlorobenzene. It is preferable that the solvent, as well as the other materials charged into the reactor, be substantially anhydrous, since in the presence of water, isocyanates are converted to urea derivatives.

The amount of carbon monoxide pumped into the reactor should be sufficient to provide at least 2 moles of carbon monoxide per azo or azoxy group. Preferably, however, a large excess should be employed to give the super-atmospheric pressures required for preferred operation of the present invention.

The catalyst for the reaction of this invention comprises a noble metal and a Lewis acid as defined in the reference book by Jack Hine, Physical Organic Chemistry, 1962, McGraw-Hill Book Company, New York. According to the reference, Bronsted acids are included by the term "Lewis acids." The noble metal may be used either in a metallic or a chemically combined state. It may be deployed either with or without a physical support. Among the noble metals which can be employed are platinum, palladium, ruthenium, rhodium, osmium and iridium. Among the chemical forms of these metals which can be used herein are oxides, sulfates, nitrates and halides, as for example: platinum oxide, platinum chloride, platinum nitrate, platinum sulfate and the corresponding palladium compounds.

The Lewis acid component of the catalyst can be a halide (e.g., an iodide, bromide, chloride or fluoride), an acetate, a sulfate or a phosphate of a metal such as tin, titanium, gallium, iron, aluminum or copper.

As specific examples of Lewis acids one can name ferric chloride, ferrous chloride, stannic chloride, stannous chloride, aluminum chloride, titanium tetrachloride, aluminum bromide, gallium trichloride and cupric chloride. Additional examples of the salt type of Lewis acids are listed in the reference book by George A. Olah, Friedel-Crafts and Related Reactions, volume I, 1963, Int. Publ., N.Y.

An example of the Bronsted acid-type of Lewis acid is anhydrous hydrogen chloride. Other Bronsted acids may be used providing they do not irreversibly react with the isocyanate product. Examples of such reactions are to be found in "Recent Advances in Isocyanate Chemistry" by R. G. Arnold et al., Chemical Reviews 57, 47 (1957).

Within the group of useful Lewis acids, it is preferred to use strong Lewis acids having a halide anion. Chlorides of iron and aluminum are especially preferred.

The physical form of the catalyst can be varied to suit particular needs. The metals can be self-supported or deposited upon a support which disperses the metals so as to increase active surface area. Such porous supports include alumina, silica, carbon, barium sulfate, calcium carbonate, asbestos, bentonite, diatomaceous earth, fuller's earth and the like.

It is possible to deposit the noble metal on a support and form the Lewis acid component in situ by conducting the reaction in a vessel which can supply a cation, when using a solvent medium which can supply an anion under reaction conditions. Similarly a noble metal and a base metal capable of forming a Lewis acid (e.g., iron or aluminum) may be deposited on a porous support. This base metal, in conjunction with a solvent medium comprising a halogenated solvent (e.g., 1,1,2-trichloro-1,2,2-trifluoroethane or a similar halogenated aliphatic hydrocarbon), forms a Lewis acid under reaction conditions. Other means of forming the Lewis acid in situ will be apparent from these procedures.

A very useful catalytic system consists of 5% palladium, supported on alumina, and ferric chloride. The catalyst should be used in an effective amount. This amount will be determined by reaction pressure and temperature, purity of the starting material, etc. Once it is known that the desired reaction proceeds in the presence of a noble metal and Lewis acid catalyst, it is within ordinary means to determine how much of each will be used. It has been found that a useful range is in the area of about $10^{-1}$ to $10^{-5}$ mole of noble metal and $5 \times 10^{-2}$ to $5 \times 10^{-4}$ mole of Lewis acid per mole of azo or azoxy group. Actually, as long as even trace amounts of the metals are present, reaction will proceed. The upper limit of catalyst usage is governed primarily by cost considerations. A preferred catalyst system will have about $2 \times 10^{-2}$—$1 \times 10^{-3}$ mole of Lewis acid and 0.05 to 0.005 mole of noble metal per mole of azo or azoxy group. Within these areas, the centers of the respective ranges are especially preferred, but this preferred range depends greatly on the equipment and conditions used, i.e., the amount of agitation, concentrations, temperature, pressure, etc.

This invention is illustrated in the following examples, in which percentages are on a weight basis.

Example 1

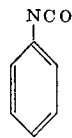

A suitable pressure vessel with stainless steel walls is charged with 124 parts of 1,1,2-trichloro-1,2,2-trifluoroethane, 2.0 parts of azobenzene and 2 parts of 5% palladium on alumina. The pressure vessel is sealed and flushed 3 times with carbon monoxide. Carbon monoxide is introduced into the clave until a pressure of 7,000 p.s.i. is obtained. With agitation, the pressure vessel is heated to 170° C. After maintaining the temperature at 170° C. for 5 hours, the pressure vessel is cooled to room temperature, vented, flushed with nitrogen and opened. The solvent-soluble material is removed; the pressure vessel is rinsed with additional solvent. The combined solvents are filtered, and the solvent is removed from the product by distillation under reduced pressure. The crude product is then distilled to give phenyl isocyanate.

Example 2

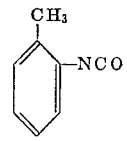

The general procedure of Example 1 is repeated, substituting an equivalent amount of o,o'-azotoluene for the azobenzene, and using a temperature of 180° C. and pressure of 11,000 p.s.i. The product is o-tolyl isocyanate.

Example 3

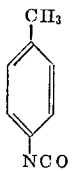

The general procedure of Example 1 is repeated, substituting an equivalent amount of p,p'-azotoluene for the azobenzene and a pressure of 13,800 p.s.i. The product is p-tolyl isocyanate.

Example 4

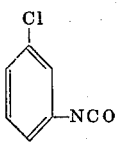

The procedure of Example 1 is repeated, substituting an equivalent amount of m,m'-dichloroazobenzene for the azobenzene and using a pressure of 13,000 p.s.i. The product is m-chlorophenyl isocyanate.

Example 5

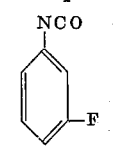

The general procedure of Example 1 is repeated, substituting an equivalent amount of 3,3'-difluoroazobenzene.

Example 6

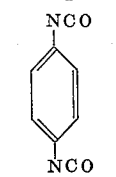

The general procedure of Example 1 is repeated, substituting an equivalent amount of 4,4'-diisocyanatoazobenzene for the azobenzene and using a pressure of 14,400 p.s.i. The product is p-phenylenediisocyanate.

Example 7

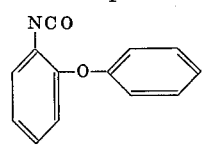

The general procedure of Example 1 is repeated, substituting an equivalent amount of 2,2'-diphenoxyazobenzene for the azobenzene and using a pressure of 14,400 p.s.i. The product is 2-phenoxyphenylisocyanate.

Example 8

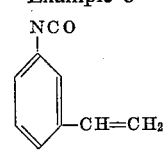

The general procedure of Example 1 is repeated, substituting an equivalent amount of 3,3'-divinylazobenzene for the azobenzene and using a pressure of 14,400 p.s.i. The product is 3-vinylphenylisocyanate.

Example 9

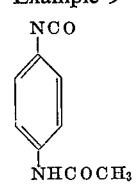

Following the procedure of Example 1, except for the use of 4,4'''-azobis(acetanilide), there is obtained 4-acetamidophenylisocyanate.

Example 10

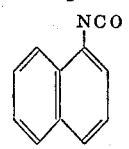

Following the procedure of Example 1 except for the use of 1,1'-azonaphthalene, there is obtained 1-naphthylisocyanate.

Example 11

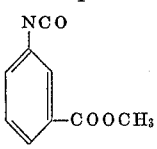

Following the procedure of Example 1 except for the use of dimethyl 3,3'-azodibenzoate, there is obtained methyl 3-isocyanatobenzoate.

Example 12

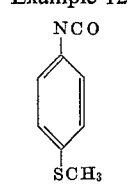

Following the procedure of Example 1 except for the use of 4,4'-bis(methylthio)azobenzene, there is obtained 4-methylthiophenylisocyanate.

Example 13

Following the procedure of Example 1 except for the use of 2-ethyl-2'-methylazobenzene, there are obtained the products 2-methylphenylisocyanate and 2-ethylphenylisocyanate.

Example 14

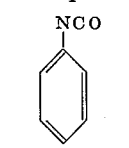

Following the procedure of Example 1 except for the use of azoxybenzene, there is obtained phenylisocyanate.

Example 15

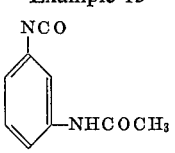

Following the procedure of Example 1 except for the use of 3,3'''-azoxybis(acetanilide), there is obtained 3-acetamidophenylisocyanate.

Example 16

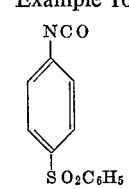

Following the procedure of Example 1 except for the use of 4,4'-bis(phenylsulfonyl)azoxybenzene, there is obtained 4-phenylsulfonylphenylisocyanate.

Example 17

A glass lined pressure vessel is charged with 2.0 parts of azobenzene, 0.3 part of anhydrous ferric chloride, 5 parts of 5% rhodium on carbon and 126 parts of 1,1,2- trichloro-1,2,2-trifluoroethane. The vessel is sealed, purged with nitrogen and pressurized with carbon monoxide to 3,800 p.s.i. With agitation, the vessel is heated at 170° C. for 5 hours, cooled, vented and discharged. The product is phenyl isocyanate.

Example 18

A glass lined pressure vessel is charged with 3.67 parts of azoxybenzene, 0.3 part of anhydrous ferric chloride, 5 parts of palladium on carbon and 79 parts of benzene. The vessel is sealed, purged with nitrogen and pressurized with carbon monoxide to 3,500 p.s.i. With agitation, the vessel is heated at 185° C. for 5 hours, cooled, vented and discharged. Phenyl isocyanate is obtained.

Examples 19–23

The general procedure of Example 1 is repeated, using different noble metal catalysts, temperatures and pressures shown below. Phenyl isocyanate is obtained.

| Example | Noble Metal Catalyst | Temperature (° C.) | Pressure (p.s.i.) |
|---|---|---|---|
| 19 | 5% Pd/BaSO₄ | 170 | 10,500 |
| 20 | 5% Pd/CaCO₃ | 180 | 13,500 |
| 21 | 5% Rh/alumina | 180 | 11,500 |
| 22 | do | 170 | 11,500 |
| 23 | Pd Black | 170 | 14,500 |

Example 24

The procedure of Example 17 is repeated substituting an equimolecular amount of stannic chloride for the ferric chloride. Phenyl isocyanate is obtained.

Example 25

The procedure of Example 17 is repeated substituting an equimolecular amount of aluminum bromide for the ferric chloride. Phenyl isocyanate is obtained.

Example 26

The procedure of Example 17 is repeated substituting an equimolecular amount of ferrous chloride for the ferric chloride. Phenyl isocyanate is obtained.

Example 27

The procedure of Example 17 is repeated substituting an equimolecular amount of aluminum chloride for the ferric chloride. Phenyl isocyanate is obtained.

Example 28

The procedure of Example 17 is repeated substituting an equimolecular amount of cupric chloride for the ferric chloride. Phenyl isocyanate is obtained.

We claim:
1. A process of preparing an isocyanate which comprises reacting, in the presence of a catalyst consisting essentially of a noble metal or compound thereof selected from the groups consisting of oxides, sulfates, nitrates and halides, and a Lewis acid, carbon monoxide and a carbocyclic aromatic azo or azoxy compound, in amounts of at least 2 moles of carbon monoxide per azo or azoxy group, said reaction being conducted under substantially anhydrous, hydrogen-free, super-atmospheric pressure conditions and at an elevated temperature below that at which the starting materials and the product isocyanate decompose.

2. The process of claim 1 wherein the Lewis acid is a member selected from the group consisting of the halides of iron, aluminum, tin, titanium, gallium, and copper.

3. The process of claim 1 wherein said reaction is conducted under substantially anhydrous, hydrogen-free conditions at a pressure of at least 1,000 p.s.i. and at an elevated temperature below that at which the starting materials and the product isocyanate decompose.

4. The process of claim 1 wherein said reaction is conducted under substantially anhydrous, hydrogen-free conditions at super-atmospheric pressure and at a temperature of at least 140° C.

5. The process of claim 1 wherein the noble metal is dispersed on a porous support.

6. The process of claim 1 wherein the compound is azobenzene.

7. The process of claim 1 wherein said compound is o,o'-azotoluene.

8. The process of claim 1 wherein said compound is m,m'-azotoluene.

9. The process of claim 1 wherein said compound is azoxybenzene.

10. The process of claim 1 wherein said noble metal is platinum, palladium, ruthenium, rhodium, osmium or iridium.

References Cited

UNITED STATES PATENTS 3,063,980 11/1962 Bloom et al. _____ 260—689 XR
3,070,618 12/1962 Drummond _____ 260—453
3,370,078 2/1968 Bennett et al. _____ 260—453

FOREIGN PATENTS 1,025,436 4/1966 Great Britain.

CHARLES B. PARKER, Primary Examiner

D. H. TORRENCE, Assistant Examiner

U.S. Cl. X.R.

252—460, 472; 260—143, 194, 205, 206, 207.1